Figure 1:
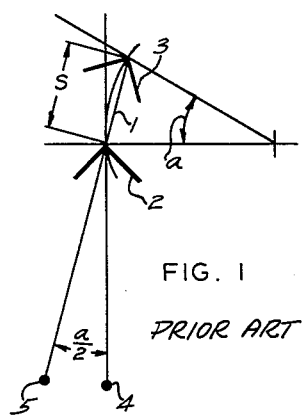

Nov. 24, 1964   R. A. WOODSON   3,158,674
INTERFEROMETER FOR MEASURING DISTANCES NORMAL TO A PLANE
Filed Oct. 27, 1958   4 Sheets-Sheet 1

ROBERT A. WOODSON
INVENTOR

BY Delbert G. Warner
ATTORNEY

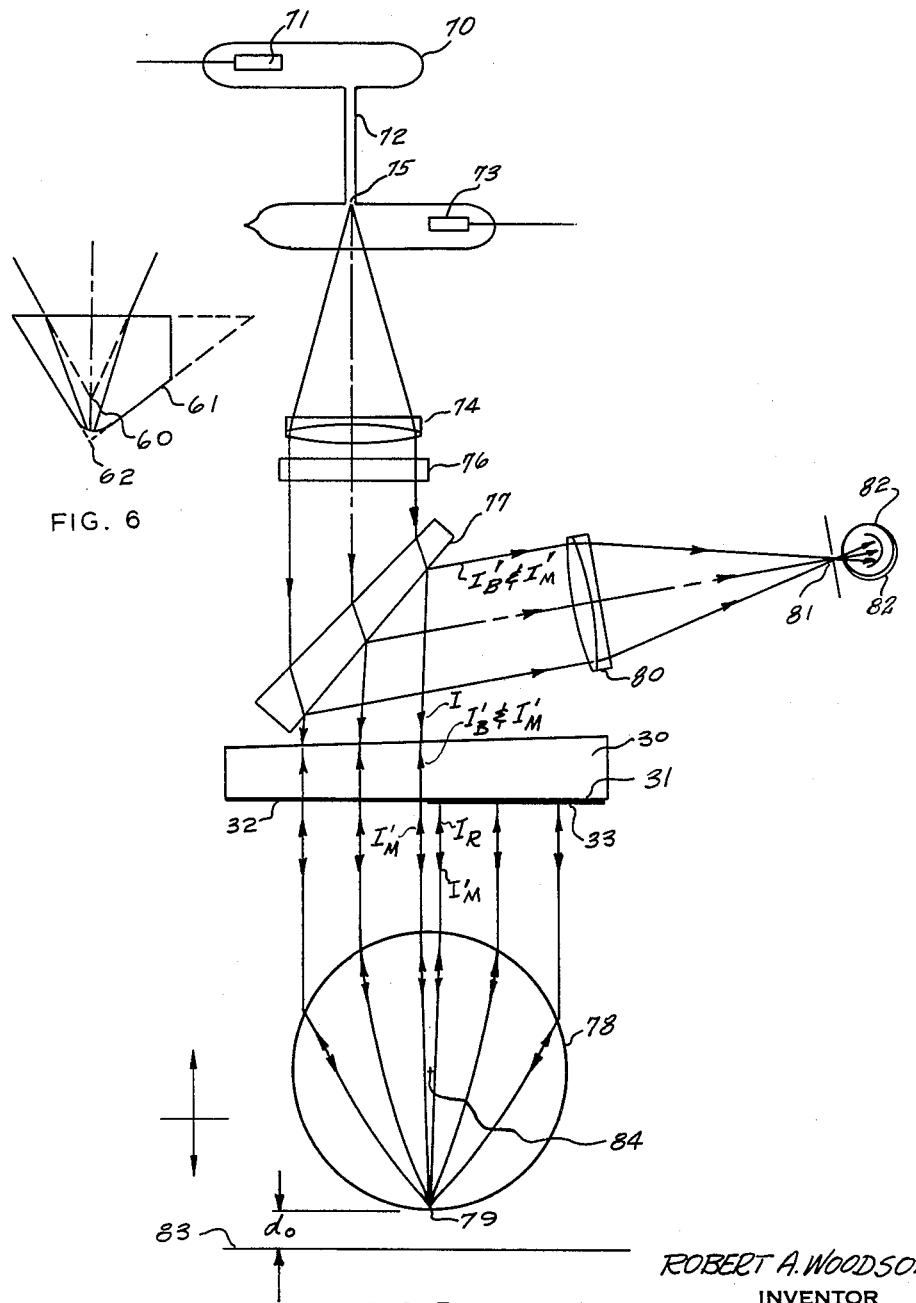

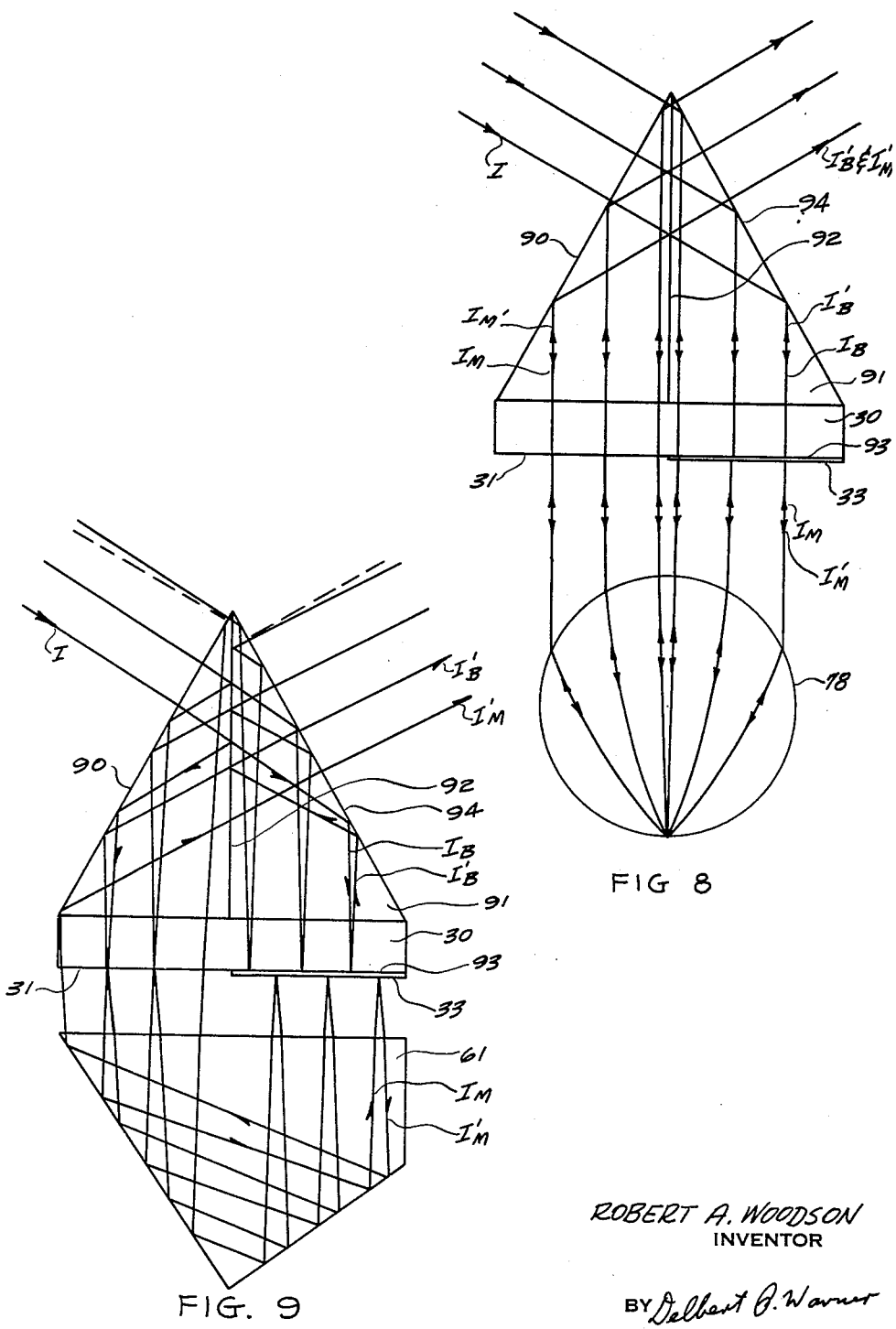

United States Patent Office 3,158,674
Patented Nov. 24, 1964

3,158,674
INTERFEROMETER FOR MEASURING DISTANCES NORMAL TO A PLANE
Robert A. Woodson, Vestal, N.Y., assignor to General Precision, Inc., a corporation of Delaware
Filed Oct. 27, 1958, Ser. No. 769,736
8 Claims. (Cl. 88—14)

This invention relates to optical interferometers and more particularly to an interferometer which may be used for accurately measuring distances normal to a plane.

Among the prior art devices are those disclosed in Patent No. 2,571,937, issued on October 16, 1951, to Edson Peck, and Patents No. 2,583,596 and 2,604,004, issued to Elihu Root III as well as patent application No. 609,467 of John Kaufmann and Woodrow L. Hayes, filed September 12, 1956, now Patent No. 2,977,841, and assigned to the same assignee as the instant application.

The patent to Edson Peck utilizes the retroreflective property of a triple mirror or a cube corner prism for measuring the distance that a test point has moved on the arc of a circle, the fringe count being a direct measure of the change in chord length. The patents to Root and the application of Kaufmann and Hayes are designed for use in the measurement of the distance that a test point moves along a straight line normal to a plane, the fringe count being a direct measure of the change in optical path difference between the two arms of a Michelson-type interferometer having cube corner prisms as end reflectors. The path difference is essentially twice the distance between the apex of the movable cube corner prism and the apex of the image of the fixed cube corner prism which is formed by the beam splitter.

All of these devices suffer from disadvantages; some of these devices must be kept in rigid alignment, others require that certain variable correcting factors be applied to results obtained from their use. Put in another way, the fringe count measures not the desired true perpendicular distance, but the slant distance between a pair of cube corner prism apex positions. Moreover, misalignment of the cube corner prisms results in a reduction of the signal-to-noise ratio of the counting signal, thereby reducing the maximum distance which can be measured without losing count. A further discussion of these points will be found in the disclosure in connection with the first two figures of the drawings.

It is an object therefore of this invention to provide an interferometer capable of measuring the true change in the perpendicular distance between a test point and a reference plane when the test point is moved from place to place along an arbitrary path which need not be perpendicular to the reference plane and, indeed, need not be a straight path.

It is a further object of this invention to provide an interferometer which is insensitive to the tilt of any moving member thereof and which is insensitive to lateral displacement, parallel to a reference plane, of any moving member thereof.

It is still a further object of this invention to provide an interferometer which maintains the contrast between the maxima and minima in the interference pattern at the highest value commensurate with the path difference and spectral line width.

Figure 3A:
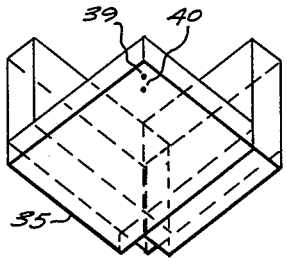
Figure 3B:
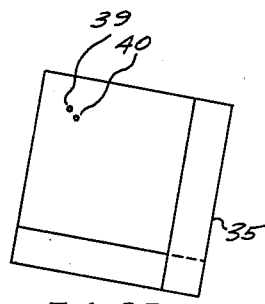
Figure 2:
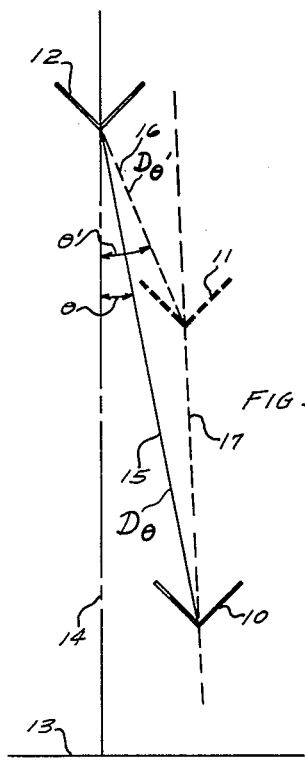
Figure 3:
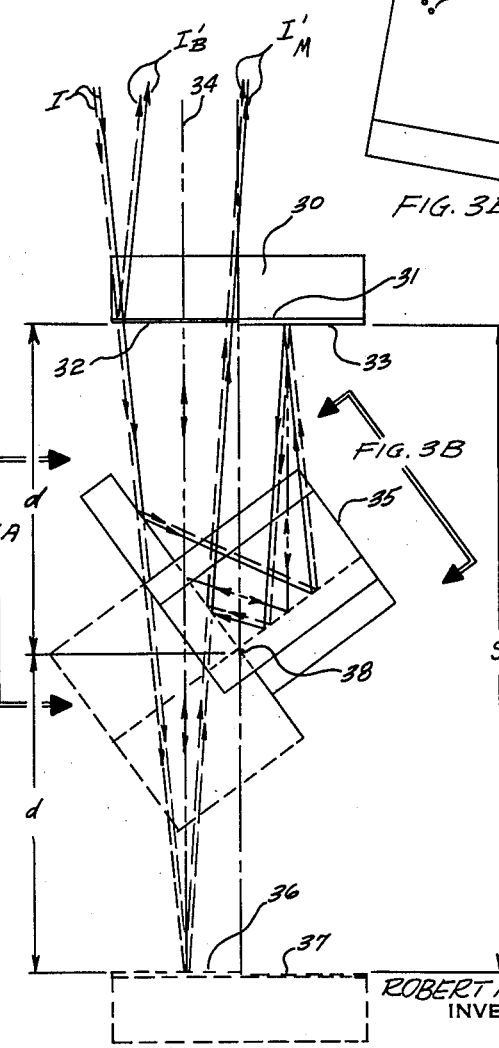
Figure 4:
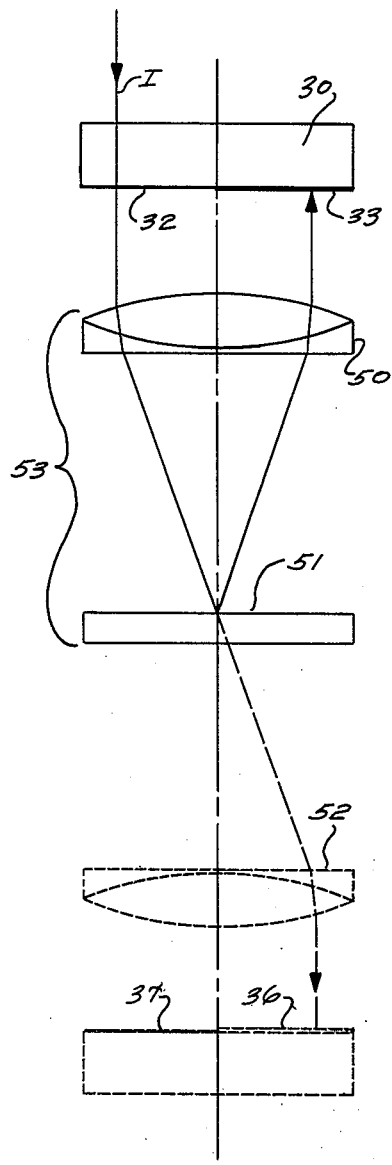
Figure 5:
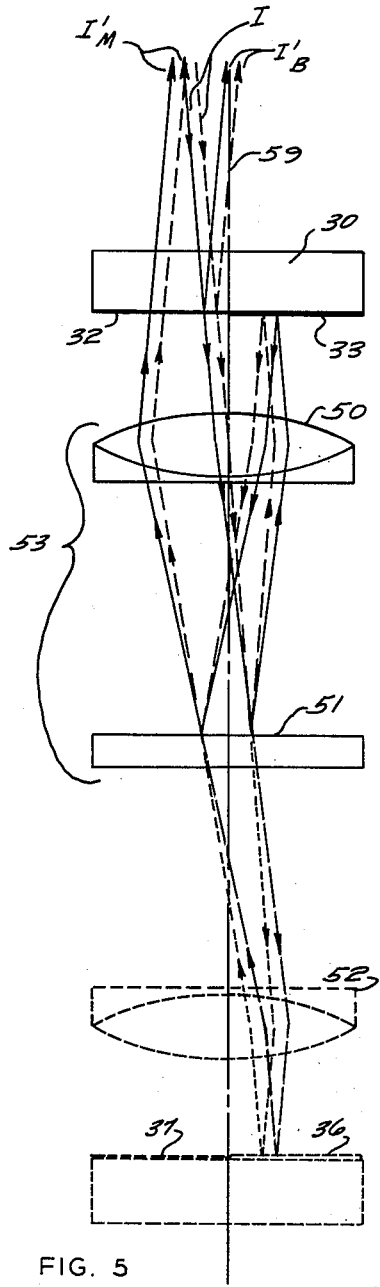
Figure 4A:
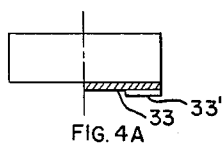

Further objects of this invention will become apparent from a study of the detailed specification which follows in connection with the following drawings, in which:

FIG. 1 shows a prior art device which requires a change in viewpoint for its accurate use, FIG. 2 illustrates a prior art device in which an angle function correction must be applied, FIG. 3 is a view of one embodiment of the invention showing a portion thereof in section, FIG. 3A is an end view of a retroreflector used in connection with the embodiment of the invention shown in FIG. 3, FIG. 3B is a further view of a retroreflector used in connection with the embodiment of this invention shown in FIG. 3, FIG. 4 is a sectional view showing an embodiment of the invention and an optical equivalent thereof in which an auto-collimator is used, including a normal ray, FIG. 4A is a variation of a portion of the embodiment of the invention shown in FIG. 4, FIG. 5 is a further view of the embodiment of FIG. 4 including a pair of oblique rays, FIG. 6 is a sectional view of a cube corner prism suitable for use in connection with this invention, FIG. 7 is a sectional view of one embodiment of the invention illustrating its manner of use with a light source and photomultiplier, FIG. 8 is a sectional view of an alternative embodiment of the invention using a Kosters prism, and FIG. 9 is another variation of the embodiment illustrated in FIG. 8.

The customary definition of a retroreflector will be used in this disclosure, namely a component possessing the property of reflecting incident radiation such that the angle of deviation is substantially equal to 180° for all angles of incidence within its useful field, and having the property of being substantially free from optical aberrations for the circumstances in which it is utilized. To retroreflect is to reflect with a deviation angle of 180°.

The drawing in FIG. 1 serves to illustrate a common drawback to the prior art devices. This illustration is like FIG. 10 in the patent to Peck No. 2,571,937, which uses a fringe-counting interferometer in order to obtain a direct measurement of the chord. This figure is used by Peck to show how the fringe count in his interferometer is a direct measure of the chord connecting the apex of the fixed triple front surface mirror 2 with the apex of the other triple front surface mirror 3 which moves through the angle $a$ around the arc whose chord 1 has the length S. Note that the chord is incline at the angle $a/2$ with respect to the tangent to the arc at either end of the chord.

Peck points out in his patent that the center of the interference fringe pattern changes direction as the moving triple mirror moves around the curved path. Thus, the observer should move from point 4 to point 5 as the moving prism moves through the angle $a$ and the direction of the center of the fringe pattern moves through the angle $a/2$. This figure illustrates that the prior art devices have an inherent need for the application of corrections in order to measure true distances.

FIG. 2 shows diagrammatically why the fringe-counting Michelson type of interferometer with retroreflecting end mirrors requires accurate and permanent alignment of the path of the movable retroreflector so that it coincides with the normal to the reference plane through the apex of the image of the fixed retroreflector. The movable retroreflector is shown in one position at 10 and in dashed lines at a position 11 with an image of the fixed retroreflector at 12. A reference plane is shown at 13 with a normal at 14 which passes through the apex of the image of the fixed retroreflector. The direction of the center of the interference fringe pattern or "fringe axis" is along the line 15 when the movable retroreflector is at its position 10, and the fringe axis is along the line 16 when the movable retroreflector occupies a position at 11. As the movable retroreflector shifts from its position 10 to its position 11 along path 17, the angle between the fringe axis and a normal 14 as measured from 12 shifts from $\theta$ to $\theta'$, which means that the interference fringe detector must "look" in a different direction in order to stay on the central fringe, otherwise a fringe counting error will result. Even then the measured distance is not the length of line 17 between positions 10 and 11, but is the difference between the length of line 15 between positions 10 and 12 and the length of line 16 between positions 11 and 12. Moreover if line 17 is not normal to the reference plane 13 a further correction is necessary to obtain the normal component of the distance moved between positions 10 and 11. The expression for the normal component of the distance moved $D_n$ has the form $$D_n = D_\theta \cos \theta - D_{\theta'} \cos \theta'$$

where $D_\theta$ is the slant distance between positions 10 and 12 and where $D_{\theta'}$ is the slant distance between positions 11 and 12. If this correction is not made the measured distinct is in error by $\Delta D$. $\Delta D = (D_\theta - D_\theta) - D_n$, $\Delta D = D_\theta (1 - \cos \theta) - D_{\theta'} (1 - \cos \theta')$.

If the movable retroreflector is permitted to move in a direction deviating from the perpendicular 14 shown in FIG. 2, an error in the fringe count results from the inability of the interference fringe detector to "look" in a correctly varying direction as indicated in the preceding paragraph. Even if said detector did "look" in the correctly varying direction, the measurement error $\Delta D$ remains. This error is of considerable importance in situations where very accurate measurements are desired, as in the present usage, where the accuracy of measurement is of the order of $10^{-6}$ inches. Along with the direct error in fringe counting resulting from this deviation from the perpendicular, there occurs a drop in the signal to noise ratio in the count signal which results in the reduction of the maximum distance which can be measured without losing count. This means that while the use of cube corner prisms as end reflectors in the fringe-counting Michelson type of interferometer eliminates the necessity of accurately setting and holding the angular orientation of the cube corner prisms, it is still necessary to control the lateral position of the apex of the movable prism so that it moves along a particular straight line which passes through the apex of the image of the fixed prism and which is accurately perpendicular to the anvil surface.

This invention is designed to overcome the foregoing limitations by providing a construction such that when the test point moves along a straight line which is not normal to the reference plane, the fringe count will be a direct measure of the distance traveled times the cosine of the angle between the normal and the path of the test point. The invention is designed so that the test point may move along any path (straight, curved in a plane or doubly curved) and the fringe count will be a direct measure of the normal component of the distance traveled by the test point with respect to the reference plane. Moreover, by design this invention has inherently twice the sensitivity of the Michelson type of interferometer. Furthermore, this invention is designed so that the central order of interference is always along a direction that makes substantially a fixed angle with all fixed members regardless of the position of any movable member.

In this disclosure the position of a rigid member is defined as including both the position of its center of mass and the angular "attitude" of the member with respect to a frame of reference by definition therefore, position includes centration and orientation. The centration of a rigid member is defined as the set of three Cartesian coordinates which relate the center of mass of the rigid member to a frame of reference. The orientation of a rigid member is defined as the set of three direction cosines which relate the attitude of the rigid member to a frame of reference.

In this disclosure motion is defined as a change of position and includes both translation and rotation. Translation of a rigid member is a change in centration without rotation and is motion in which all points of a rigid member experience equal linear displacements. Rotation of a rigid member is a change in orientation and is motion in which all points of a rigid member experience equal angular displacements about an axis.

In this disclosure it is necessary to distinguish between two types of translation, namely "paramotion" and "normotion" as related to a reference plane. Paramotion is defined as translatory motion parallel to the reference plane. Normotion is defined as translatory motion normal to the reference plane. There are also two types of rotation, namely tilt and twist as related to the same reference plane. Tilt is defined as rotary motion about an axis which is parallel to the reference plane. Twist is defined as rotary motion about an axis which is normal to the reference plane.

For the purpose of this disclosure we shall define a bifacial reflector as a component having the properties of a pair of substantially parallel, aberrationless plane reflectors that face in opposite directions. An example of a bifacial reflector is a parallel plate of glass bearing upon one face a reflecting film of aluminum such that it may be used either as a first surface mirror or as a second surface mirror. A bifacial reflector need not be full reflecting; for example, it may be a beam splitter comprising a parallel plate of glass bearing upon one face a partial reflecting/partial transmitting film of metal or dielectric.

The useful aperture areas of a bifacial reflector may, but need not, overlap for the radiation incident upon the two sides. The useful aperture areas of a bifacial reflector may, but need not, have the same reflectance/transmittance properties for the radiation incident upon the respective useful aperture areas of the two sides. A bifacial reflector may, but need not, comprise a parallel plate of glass bearing upon one portion of one face a partial reflecting/partial transmitting film of metal or dielectric and bearing upon another portion of the same face a substantially full reflecting film of metal such as aluminum or silver.

A common property of all bifacial reflectors is that if two beams of plane waves are incident upon opposite sides of a bifacial reflector, an upper beam from above and a lower beam from below such that the wave fronts of the upper incident beam are parallel to those of the lower incident beam, but traveling in opposite directions, then the wavefronts of the upper reflected beam will be parallel to those of the lower reflected beam, and will travel in opposite directions. For the purpose of this disclosure we shall define a Semifacial reflector as a bifacial reflector having the properties of a beam splitter over one portion of its aperture and having the properties of a substantially full reflector over another portion of its aperture.

There are various types of beam splitters which have been used in interferometers. In order to clearly explain the extent and scope of this invention it is necessary to use a generic definition of a beam splitter. This is best defined using several technical terms which are first defined as follows:

(1) A wavefront is defined as a surface over which the phase of a beam of radiation is constant.

(2) The phase $\phi$ of an electromagnetic wavefront at a given field point in space is defined to be an angle equal to $2\pi f t$ where $f$ is the frequency of the electromagnetic radiation and $t$ is the time required for the wavefront to travel from the source of radiation to said field point.

(3) A certain wavefront of one beam is said to be "isophase" with respect to a certain wavefront of another beam if the two beams are isogenous (i.e. if they have the same source) and if at some instant in time the two wavefronts have the same phase.

(4) Two isogenous beams of plane waves are said to be "isophase" if an arbitrary pair of isophase wavefronts, one from each beam, are coplanar.

(5) Two isogenous beams of plane waves are said to be "biphase" if an arbitrary pair of isophase wavefronts, one from each beam, are biplanar.

(6) For the purpose of this disclosure we shall define "beam splitter" as the plane upon which is incident a beam of plane waves of electromagnetic radiation such that said incident beam is split at said plane surface into a pair of biphase split beams.

(7) In the above definitions it is understood that only under ideal conditions will a wavefront or an optical surface be precisely flat or "plane." In actual situations the departure from flatness may be quite small, yet not zero. Consequently in the above definitions and elsewhere in this patent disclosure and claims, wherever a wavefront or an optical surface (such as a reflector or beam splitter) is called "plane," the reader must understand that this is to be interpreted as meaning "substantially plane."

The essential parts of a particular embodiment of the instant invention are shown diagrammatically in FIG. 3. In FIG. 3, a transparent plate is shown at 30 having an optically flat surface at 31 upon which has been deposited a partial reflecting mirror at 32 which serves as a beam splitter in according with the preceding definition. At 33 there is shown affixed to the surface 31 a front surface mirror made of a highly reflective coating such as aluminum. A normal ray is shown at 34 which may pass through plate 30 in either direction without deviation. Inclined incident rays are indicated at I which pass through plate 30 until they strike partial reflecting mirror 32 which will pass a portion of them as shown and reflect a portion as indicated at $I_B'$. The transmitted portion of the light strikes the retroreflector 35 which reflects the light along a laterally displaced path which is accurately parallel to the incident light. This light now travels upward striking the front surface mirror 33 which reflects it downward. Note that the ray which was split at 32 is incident (in air) at the same angle on surface 32 as on surface 33, though travelling in the opposite direction. This means that for any given incident ray, prior to splitting at 32, the reflected rays from 32 and from 33 will be reflected at the same angle (in air) at 32 and 33, though traveling in opposite directions. The presence of a glass plate 30 on the incident side of 32 does not alter the parallelism of the reflected rays (in air) if the plate has a constant wedge angle over its aperture and if it is optically homogeneous.

It is important to the understanding of the principle of this invention that one notes that the rays reflected at 32 and 33 are parallel (in air) before reflection, and therefore are also parallel (in air) after reflection. The ray reflected at 33 travels downward toward the retroreflector 35 which reflects the light along a laterally displaced path which is accurately parallel to that incident from mirror 33. The ray which has now been twice retroreflected by 35 travels upward to the beam splitter 32 which partially reflects the ray downward and partially transmits it upward through the plate 30 into the air as ray $I_M'$. This ray $I_M'$ is parallel to the ray $I_B'$ which has previously been split off at 32. The parallel rays $I_B'$ and $I_M'$ will interfere, resulting in a fringe pattern the energy distribution of which depends upon the amplitudes of $I_B'$ and $I_M'$ and their relative phase.

The amplitudes of $I_B'$ and $I_M'$ can be made approximately equal by choosing the correct reflectance for the beam splitter 32 in connection with the reflectance of the mirror 33 and of the retroreflector 35 as well as possible absorption of light as the ray $I_M'$ is propagated from 32 to 33 and back to 32. For example, if the reflectance of the mirror 33 is 90% and if absorption between 32 and 33 is slight and may be neglected, the reflectance of the beam splitter 32 should be approximately 36.4% in order to balance the amplitudes of the rays $I_B'$ and $I_M'$. Reflectances of these values are possible by present optical manufacturing techniques.

The relative phase of the rays $I_B'$ and $I_M'$ is best analyzed by considering the optical equivalent of the instant invention, namely a Fabry-Perot type interferometer which consists of accurately parallel reflecting surfaces such as those shown at 32 and 36 in FIG. 3. The surface 32 in this construction is the same as previously described, namely a partial reflecting beam splitter. The surface 36 is a front surface mirror having substantially the same reflectance as the mirror 33 of the instant invention, and in fact being a mirror image of 33 formed by the retroreflector 35. Thus it is that the distance S between 32 and 36 is just twice the distance $d$ between 32 and 38 where 38 is the apex of the retroreflector 35, and the initial and terminal portions of the paths traveled by the rays is the same whether they are retroreflected by 35 and reflected by 33 or travel straight to 36 and are reflected as indicated at 36.

It is a common property of all retroreflectors that an inverted image of an object is formed having symmetry about a point which is fixed with respect to the position of the retroreflector, and which corresponds to the symmetry center 38 in the retroreflector shown in FIG. 3. Because of this property, motion of the retroreflector through a distance $S/2$ will cause the image of a fixed object to move a distance S in the same direction. Therefore, in the Fabry-Perot type interferometer the order of interference between ray $I_M'$ and ray $I_B'$ will be $m$, where $m\lambda = 2S \cos \theta$; where:

$\theta$ = angle of incidence (in air) of the ray,
$\lambda$ = wavelength of the ray (in air),
$2S$ = twice the separation between 32 and 36.

FIGS. 3A and 3B show views of the retroreflector 35 and further illustrate the points of incidence 39 and 40 of the incident rays I. It is clear from these figures that a triple mirror retroreflector has been used in this particular embodiment, and the relationship of the mirrors to each other is set forth.

The beam splitter 32 shown in FIG. 3 may be a partial reflector having substantially a constant reflectance and a constant transmittance over all portions of its useful aperture. Alternately it may comprise some areas which are substantially full reflector regions and other areas which are substantially full transmitter regions. Such areas may be formed variously as stripes, checkered, etc. Preferably the full reflector regions will have the same area as the full transmitter regions.

The advantage of a striped beam splitter is that it may be fabricated using techniques for forming second surface mirrors (such as by chemical silvering methods) where the more complex techniques of forming partial reflection coatings may not be propitious.

This invention embraces other forms of plane beam splitters as well, and is not to be restricted to the usual forms such as those already discussed. An example of another form of beam splitter is a polarizing means which may transmit one plane polarized component and reflect the orthogonal plane polarized component. Circular or elliptical polarization may also be used. Such polarization components and their polarization retardation plate accessories are well known in the optical art and need not be described here. Another example of a different form of beam splitter is an element which intermittently reflects and transmits the incident radiation. If the frequency of the intermittence is adequately high, it may be used in the present invention as a beam splitter.

In any case, the beam splitter 32 and the front surface mirror 33 which are deposited upon the plane surface 31 of plate 30 comprise a bifacial reflector.

A variation of the instant invention is shown in FIG. 4 in which the retroreflector is of the autocollimating lens type. In this figure the bifacial reflector plate 30 is shown with its partial reflecting beam splitter surface at 32 and its front surface mirror at 33 as described in connection with the embodiment illustrated in FIG. 3. In this construction the retroreflector 53 comprises an autocollimating lens assembly 50 and a front surface mirror 51 which is located in a focal plane of the lens assembly 50. In this construction the mirror 51 forms a virtual image of the lens 50 at 52, and a virtual image of the partial reflecting surface 32 and the front surface mirror 33 at 37 and 36, respectively. In FIG. 4 is shown incident ray I which is normal to the beam splitter surface 32, the mirror surface 33 and its image 36. This system is more readily understood by considering its optical equivalent interferometer system which comprises plate 30 with beam splitter surface 32, lenses 50 and 52, and mirror 36.

The autocollimating lens type retroreflector is shown again in FIG. 5 with corresponding parts labeled as in FIG. 4. However, the incident rays I are shown as entering the bifacial reflector plate 30 at an angle from the perpendicular and with their paths traced through various stages or reflection and refraction. The initially reflected rays are shown at $I_B'$ and those rays which pass through the partial reflecting mirror at 32 are shown at $I_M'$ following their path through the retroreflector. Again the optical equivalent interferometer system has been shown for clarity.

As in FIG. 3, the emerging inclined rays $I_B'$ and $I_M'$ of FIG. 5 produce an interference pattern obeying the equation:

$$m\lambda = 2S \cos \theta$$

Since $S=2d$, $$m\lambda = 4d \cos \theta$$

Thus when $\theta=0$ each fringe count corresponds to a motion of symmetry center 59 through a distance $\Delta d = \lambda/4$, where the symmetry center 59 is located at the front focal point of lens 50. This is twice as sensitive an arrangement as the prior art Michelson type of interferometer in which each fringe count corresponds to a motion of the apex of the moving retroreflector through a distance $\Delta d = \lambda/2$. For very accurate distance measurements this doubling of the sensitivity of the interferometer represents a very great advantage.

The fringes may be counted reversibly by utilizing a $\lambda/4$ retardation coating which may, for example, be placed over one half of the aperture of the mirror 33. In this case the actual thickness of a transparent coating could be $\lambda/[8(n-1)]$ where $\lambda$ is the wave length of the light in air and $n$ is the refractive index of the coating medium. Alternatively, as shown in FIG. 4, the coating could be an additional $\lambda/8$ layer of aluminum 33' over half of the aperture of the mirror 33.

As in most interferometers, essentially monochromatic light could be used so that along the normal direction ($\theta=0$) the path difference would be measurable in terms of the known wave length of the incident light, thus yielding the normal distance $d_0$ in terms of this wave length $\lambda$ and the fringe count or order number $m$ in accordance with the following:

$$d_0 = m\lambda/4 \quad \theta=0$$

If the monochromatic light source is a small spot (such as the end of the bright capillary of a Geissler discharge tube of krypton or other radiating gas) located in the focal plane of a collimating lens so oriented that the emerging collimated light rays are parallel to the normal ray shown in FIG. 3 and 4, the inclination angle $\theta$ of these rays could be limited so that the order of interference $m$ of all rays would be equal within a tolerance which is less than one-half for path differences which are acceptably large.

It should be noted that the possible range of order $m$ is more restricted in this invention than in the Michelson-type of interferometer, since in this device $m$ can never become negative, nor can it become smaller than a minimum which is given by $m_{\min}$. The value of $m_{\min}$ may be expressed in the following equation:

$$m_{\min} = 4m_R$$

where $m_R$ is the minimum number of radiation wave lengths between the mirror 33 and the lower optical extremity of the retroreflector 53, this occurring when 53 is as close as possible to the front surface mirror 33. In the case of a triple mirror or a cube corner prism type retroreflector, the lower optical extremity of the retroreflector is the apex designated at 38 in FIG. 3. In the case of an autocoliminatnig lens type retroreflector such as retroreflector 53 in FIG. 5, the lower optical extremity is a lower focal point of the autocollimating lens which coincides with the front surface mirror 51. For example, if the retroreflector is a cube corner prism having an altitude dimension $h$ measured between the apex and the entrance/exit face and consists of glass having a refractive index $n$ and is used with light having a vacuum wave length $\lambda$, the corresponding $m_R$ is $nh/\lambda = h/\lambda'$ where $\lambda'$ is the wave length of the light in the cube corner prism. In this case, the minimum order number would be:

$$m_{\min} = 4m_R = 4nh/\lambda$$

The maximum order number $m_{\max}$ is limited by the spectral shape of the radiation used as well as by the range of angles of incidence accepted by the detector. Further limitations of $m_{\max}$ results from various imperfections in the optical components, such as aberrations in the retroreflector, errors in flatness and parallelism of the beam splitter 32 and the mirror 33 which compose the bifacial reflector plate 30, or optical inhomogeneity of the medium through which the interfering beams pass. Some of these errors can compensate each other. For example, if the retroreflector is a triple mirror or a cube corner prism having an angle error so that retroreflected rays are not exactly parallel to incident rays, it is possible to compensate by having a suitable angle error, both in magnitude and direction, between the beam splitter 32 and the mirror 33. The necesary and sufficient condition for complete correction of such angle errors in the retroreflector is the requirement that the mirror 33 be normal to all rays incident thereon which were normal to the beam splitter 32 when incident thereon. This angle compensation should be limited to small values, since it introduces a second-order error in the fringe count if the retroreflector 53 is moved laterally in a direction which is parallel to the surface of the beam splitter 32 but not parallel to the surface of the mirror 33.

The symmetry center 60 of a cube corner prism 61 is located at the refractive image 60 of the apex 62 as shown in FIG. 6. In the practical use of a cube corner prism as a retroreflector in the instant invention, apex 62 could be spherically ground and polished to form a tip concentric to apex image 60 and subsequently coated with a concentric shell of hard material for protection and durability. Alternatively a spherical tip could be attached to the cube corner prism 61 so that its center coincides with the symmetry center 60. These types of retroreflector and tip combinations are insensitive to tilt, just as is the triple mirror discussed previously.

The instant invention may be combined into a system such as that shown diagrammatically in FIG. 7. A light source is shown at 70 which consists of a Geissler discharge tube containing krypton gas at about 4 millimeters of mercury pressure. A D.C. discharge from the cathode 71 through a capillary tube 72 to the anode 73 excites the krypton atoms so that they yield light having characteristic frequencies. A collimator lens 74 is positioned so that the light from the effective center of the source as indicated, for example, at 75 is refracted so that it is rendered parallel. An interference filter 76 is placed in the path of this light so that only light of the desired frequency, corresponding to the wave length $\lambda$ used in this discussion, passes through. This parallel monochromatic light passes down toward a semi-reflecting dividing plate 77.

The light transmitted downward through the dividing plate 77 constitutes rays I which enter the bifacial reflector plate 30 and encounter the partial reflecting second surface mirror beam splitter 32 which is a dialectic coating on half of the lower flat surface 31 of the bifacial reflector plate 30. The light is split at 32, and one portion is reflected upward to form rays $I_B'$. Another portion of this light is transmitted downward to a retroreflector 78 of the Toraldo lens (Refer to J. Opt. Soc. Am., vol. 47, No. 6, page 566 (June 1957)) type which reflects these rays upward along laterally displaced paths which upon emergence from the retroreflector are accurately parallel to the incident paths. These upwardly directed rays labeled $I_R$ are incident on the front surface mirror 33 which comprises a coating on the lower flat surface 31 of the bifacial reflector plate 30 where the rays are reflected downward again. The rays reflected from 33 are designated $I_M$. These rays $I_M$ are again incident upon and reflected by retroreflector 78 at point 79 along laterally displaced parallel paths and they again encounter beam splitter 32, this time from the lower side. Part of the rays $I_M$ are reflected downward by 32 and part of them are transmitted upward through plate 30, the latter part being designated as rays $I_M'$. At beam splitter 32 the rays $I_M'$ combine with rays $I_B'$ which had been reflected upward by 32 on the first encounter. The reflectances of beam splitter 32, mirror 33 and retroreflector 78 are such that the amplitudes of the isogenous rays $I_B'$ and $I_M'$ are approximately equal and, being accurately parallel, fulfill the requirements for optical interference.

The rays $I_B'$ and $I_M'$ are partially reflected by dividing plate 77 so that the resulting Fabry-Perot type interference pattern could be observed by placing the eye at the position occupied by the stigmator lens 80 and looking towards the dividing plate 77. However, FIG. 7 shows a physical rather than a physiological detector of the interference fringe pattern. Rays $I_B'$ and $I_M'$ enter stigmator lens 80 which forms an image of the concentrated source of light at the exit pin hole 81 which blocks out ghost images which may have arisen from undesired reflections at various optical surfaces along the path. The interfering rays $I_B'$ and $I_M'$ pass through the exit pin hole 81 and impinge upon a photomultiplier tube shown at 82, the electrical output of which is responsive to the relative phase of rays $I_B'$ and $I_M'$.

As the retroreflector 78 moves with respect to mirror 33, the path difference changes and the photomultiplier 82 will send an oscillatory signal to a counter, which is not shown, to record each change in path difference between rays $I_B'$ and $I_M'$ which is of the size of one unit. This unit represents a change of $\lambda$ in the path difference between rays $I_B'$ and $I_M'$ and it also represents a change of $\lambda/4$ in the distance of the test point 79 of the retroreflector 78 from the mirror 33. Accordingly, this unit fringe count also corresponds to the motion of the mirror contact 79 a distance $\lambda/4$ relative to the mirror 33.

By raising the retroreflector 78 into contact with mirror 33 and setting the fringe counter to zero, the fringe counter will be set to indicate the increase in normal distance of the test point 79 from the mirror 33 as the retroreflector moves downward. Alternatively, the counter can be set to zero after the retroreflector 78 has been set at a test distance from the mirror 33 and on raising the retroreflector 78 to contact the mirror 33, the counter will indicate this test distance in quarter wave length units. Thus, one possible procedure for measuring the length of a test piece is to place it under the mirror 33, bring the retroreflector 78 up to contact the bottom of the test piece when the top of the test piece is in contact with the mirror with a certain predetermined force, then reset the counter to zero, remove the test piece, raise the retroreflector 78 to contact the mirror 33 with the same predetermined force, and read the counter which indicates the test dimensions in quarter wave length units.

To avoid blocking part of the aperture of the rays $I_M$, a different measuring procedure is recommended. Below the retroreflector 78 is placed a measuring anvil whose top surface forms a reference plane 83 which is parallel to partial reflecting surface 32 and mirror 33 and is rigidly held a fixed distance therefrom. The stability of this reference plane distance is easily checked by the instant invention merely by observing the constancy of the fringe count as the retroreflector moves from the reference plane 83 to the mirror 33 on successive runs. Moreover, the parallelism of 83 and 33 can be established and subsequently checked by removing the retroreflector 78 and observing the interference pattern using the reference plane 83 as the end reflector for the split beam which is transmitted by partial reflecting surface 32. Now the test piece can be measured as in the prior art Michelson type of interferometer by placing it on the reference plane 83, lowering the retroreflector 78 until its test point 79 contacts the test piece with some predetermined force, resetting the counter to zero, removing the test piece, lowering the retroreflector 78 until contact point 79 contacts the reference plane 83 with the same predetermined force, and reading the counter which indicates the test dimension in quater wave length units. Note that this measured dimension is the normal distance $d_0$ shown in FIG. 7 and not the slant distance $d$ which may have been traveled by the retroreflector 78 as it moved up and down. With this invention no counting error is introduced by paramotion, tilt or twist of the retroreflector. Only the normotion or normal component of motion is measured.

As mentioned previously with respect to FIG. 4A, the instant invention may include a $\lambda/8$ retardation step over half of mirror 33 to produce two interference patterns which are 90 degrees out of phase. Two photomultipliers such as 82 can then be used, one to respond to each interference pattern and thereby achieve reversible counting as in the Root patents.

Low reflection coatings may be applied to the air-glass surfaces which are not otherwise coated so that less light will be lost into ghost images. In the case of the Toraldo lens type of retroreflector the test point 79 may be coated with silver for high reflectance and then overcoated with chromium for wear resistance.

The interference filter 76 shown in FIG. 7 may be placed in a different part of the system, such as between the dividing plate 77 and the stigmator lens 80. Moreover, the selected monochromatic radiation can be separated from the other radiations present by inserting a dispersing prism or prisms in place of the interference filter 76.

Retroreflectors that are available have aberrations which may be expressed as an angle error magnitude and direction $(r, \theta)$ as a function of the two dimensional aperture coordinates $(x, y)$. It is sufficient to consider only half of the full aperture. This half may conveniently be the half lying under the beam splitter 32 or, alternatively, the half lying under the mirror 33. The angle error $(r, \theta)$ of the retroreflector 78 may be corrected by interposing a corrector plate in the path of the rays $I_M$ adjacent to the retroreflector and having the required deviation function magnitude and direction $(r', \theta)$ as a function of the aperture coordinates $(x, y)$. A simple wedge may be used to compensate for this angle error of the retroreflector.

In the foregoing portion of the disclosure of the present invention all of the illustrations have depicted systems in which the optical path length of one of the split beams is always a constant value which is essentially zero as measured between beam splitting and beam recombining. This invention is, however, not restricted to the foregoing limitation. More generally this invention embraces an interferometer system in which the optical path length of one of the split beams may be greater than zero as measured between beam splitting and beam recombining.

The present invention may comprise a system such as that shown diagrammatically in FIG. 8. A parallel beam of incident light rays I is incident normally upon entrance face 90 of a Kosters double image prism 91 which comprises partial reflecting surface 92 as the beam splitter surface. The incident light beam is split at beam splitter 92 into a first portion $I_B$ which is transmitted and a second portion $I_M$ which is reflected. Rays $I_B$ are incident substantially normally on end reflector 93 which is a second surface mirror on surface 31 of bifacial reflector plate 30 which is cemented to prism 91. After reflection at 93 the rays $I_B'$ are returned to beam splitter 92. Rays $I_M$ pass through plate 30 to the Toraldo lens type retroreflector 78 which retroreflects them so that they are incident substantially normally on end reflector 33 which is a front surface mirror and which consists of the outer surface of the metal coating on surface 31. In accordance with the properties of a bifacial reflector, the inner surface 93 and the outer surface 33 of this metal coating are substantially parallel.

Rays $I_M$, being normally incident upon end reflector 33, are reflected back in the opposite direction as rays $I_M'$, thence retroreflected by retroreflector 78 to beam splitter 92 where they are recombined in optical interference with rays $I_B'$. The recombined split beams emerge substantially normally from the exit face 94 of the Kosters prism 91 so that the interference pattern may be observed by eye or may be used to activate a photomultiplier as the case may be.

The advantage of using a Kosters double image prism as the beam splitter is that the optical efficiency is considerably higher than the system shown in FIG. 7 in which approximately half of the incident light intensity is lost by unwanted reflection of rays I at the dividing plate 77.

The passage of oblique rays through the Kosters double image prism type of beam splitter is shown in FIG. 9. Here the retroreflector 61 is of the cube corner prism type. Note that the emerging rays $I_B'$ and $I_M'$ are still parallel, though they are displaced, resulting in an interference pattern having maxima like that of the Fabry-Perot interferometer.

In both FIGS. 8 and 9 the entrance face 90 and exit face 94 serve as total internal reflection mirrors for the split beams incident thereon except for the final incidence after recombining. This characteristic of the Kosters prism is as desirable in this application as it is in the original Kosters interferometer which does not utilize a retroreflector.

In the prior art Michelson interferometer of the type which utilizes a retroreflector for each of the two end reflectors, the interference pattern is symmetrical about a point in the focal plane of the stigmator lens, said point defining a direction of plane wave propagation which is parallel to the line which connects the symmetry centers of the retroreflectors of the optically equivalent Fabry-Perot interferometer. This point of symmetry in the interference pattern is referred to as the central order of interference and corresponds to the direction along which the two interfering beams have a maximum path difference for the given positions of the optical components.

The direction of the central order of interference is important in interferometry because it is the direction for which the rate of change of path difference with direction is a minimum, even zero. As the direction of the interfering beams departs more and more from this central order direction, the path difference changes more and more.

In order to obtain a maximum output from the photomultiplier detectors they should "see" a large cone angle of interfering rays. However, in order to obtain a maximum modulation of the photomultiplier signal output, they should "see" a small cone angle of interfering rays, this cone angle being centered along the direction of the central order of interference. In practice a compromise is usually made to obtain optimum values of signal output and modulation, but particular attention is paid to aligning the optical components so that the photomultiplier will "see" a centered portion of the interference pattern in order to maximize the modulation for the given cone angle field of view. This means that the central order direction should be maintained constantly in the center of the field of view of the photomultiplier.

In the prior art Michelson interferometer of the type which utilizes a retroreflector for each of the two end reflectors, the symmetry center of the moving retroreflector must be controlled to travel in a precisely straight line which is constant in space with respect to the fixed retroreflector and which is accurately normal to the reference plane and which accurately passes through the image of the symmetry center of the fixed retroreflector as formed by the beam splitter. As pointed out elsewhere, this requirement for accurate initial alignment of the moving retroreflector and its rigid maintenance during motion of the moving retroflector constitutes a disadvantage of the prior art but the instant invention is not hampered by this requirement.

In the instant invention the central order interference direction is *always* normal to the fixed bifacial reflector surface 31 regardless of the vagaries of the moving retroreflector. This property of the instant invention results in part from the fact that only one actual retroreflector is used in the system. The direction of the central order of interference is along the line joining the symmetry center of the retroreflector and the symmetry center of the image of this retroreflector as formed by the full reflecting mirror 33, this direction being *always* normal to the beam splitter 32 which is coated upon the same plane surface 31 as is the full reflecting mirror 33, regardless of the position or orientation of the retroreflector. Of course this requires an accurate retroreflector, but its accuacy can be established originally and permanently as in the case of a cube corner prism.

The present invention may be used to test the aberrations of a test retroreflector. If in FIG. 7 the exit pinhole 81 and the photomultiplier 82 are removed and the eye of an observer is put in their place, the interference pattern may be observed. If the system is free from aberrations the field of view will be uniformly bright. If, now, the good retroreflector 78 is replaced by an imperfect one, its aberrations will be evident in the resulting interference pattern. The analysis of the aberrations from the observed interference pattern is well known in the art. In the present set-up the interference pattern for a given test retroreflector will be similar to that observed if the same test retroreflector were tested in the usual method in a Twyman-Green interferometer. The advantage of the present invention in this case is the ease of set-up and the elimination of coarse and fine angle adjustments of the end reflectors.

The present invention may also be used to test the aberrations of a parallel plate. The test parallel plate is inserted into the beam between the retroreflector 78 and the end reflector 33, taking care not to intercept rays which have not reached the retroreflector. The observed interference pattern may be analyzed by the usual method to determine the aberrations.

The present invention may also be used to measure very accurately the deviation angle of an optical wedge. The test wedge is inserted into the beam as in the case of the test parallel plate above. If the deviation angle is not more than a few seconds of arc, the observed interference pattern of parallel fringes may be analyzed by the usual method to determine the deviation angle. If the deviation angle is larger, a pair of calibrated Risley prisms may be used in series with the test wedge to compensate the deviation as in the "Interferometer Optical System," of Harold S. Hemstreet and Robert A. Woodson, filed in the U.S. Patent Office as application No. 661,540 on May 24, 1957, now Patent No. 3,072,011, and assigned to the same assignee as the present invention.

The instant invention affords numerous advantages. In the previous discussion interference of rays $I_B'$ with $I_M'$ only was considered. However, when ray $I_M'$ is incident on the beam splitter 32 from below, part of it is reflected while the major part is transmitted as ray $I_M'$ to interfere with ray $I_B'$. The part of $I_M'$ which is reflected downward at 32 is subsequently retroreflected upward by the retroreflector to the mirror 33 where it is again reflected and becomes $I_M''$ or a ray which has been twice reflected at 33. Ray $I_M''$ then proceeds downward to the retroreflector which retroflects it upward again to the partial reflecting surface 32 which transmits part of it and reflects part of it which becomes $I_M'''$ upon being thrice reflected at mirror 33. This multiple reflection results in the following interfering rays $I_B'$, $I_M'$, $I_M''$, $I_M'''$, etc., the amplitudes of successive rays decreasing in geometric progression. This arrangement of multi-ply reflected interfering rays is like that of a Fabry-Perot interferometer and by the same principle results in an interference pattern having sharp maxima separated by broad minima, the maxima occurring at the same field angles as would be the case if only rays $I_B'$ and $I_M'$ were involved. This sharpening of the interference maxima results in increasing the measured normal distance over which fringes can be reliably counted.

Another advantage of the present invention is the insensitivity of the interference pattern to a tilt of the retroreflector about its symmetry center which may be designated as 84 in FIG. 7, 38 in FIG. 3, or 60 in FIG. 6. In the case of a triple mirror type of retroreflector 35 as shown in FIG. 3 the symmetry center 38 coincides with the apex 38 of the retroreflector. When such a retroreflector tilts about the apex 38 there is no change in the path length of any of the retroreflected rays since the retroreflector is symmetrical about this point. This means, as a practical matter, that a triple mirror retroreflector could be made having a rigidly attached spherical contact tip whose spherical center is located at the apex 38, with the bottom point of the spherical tip forming a contact test point. Such a retroreflector and tip combination can be tilted appreciably without changing the fringe count while in contact with the anvil or with the top of a test piece.

It has been previously pointed out that the fringe count is independent of paramotion of the retroreflector or lateral excursions from the normal direction. This is true for a similar reason; namely, lateral displacements do not change the path length of any of the retroreflected rays. Excessive tilt or lateral displacement of the retroreflector results in reduction of the available aperture for retroreflected rays, and therefore results in reduction of the brightness and/or contrast of the interference fringe pattern, but it does not change the phase of any part of the interference fringes.

Another advantage of the present invention is that the direction of the central order of interference is always normal to the fixed bifacial reflector regardless of the centration or orientation of any moving member such as the retroreflector. This greatly facilitates the optical alignment of the components of the system.

When the present invention is used to measure the aberrations of a test retroreflector or a parallel plate or to measure accurately the deviation angle of a wedge, it has the advantage over the usual Twyman-Green interferometer set-up that neither coarse nor fine angle adjustment of the end reflectors is required.

When the present invention is used to measure the aberrations of a test retroreflector, it has the advantage over the application by Hemstreet et al. referred to above that the full useful aperture is being tested rather than only a portion of it.

Further advantages of this invention should be noted. For example, the desired normal distance is measured accurately without relying upon the precision of alignment of its means for guiding the moving test point nor relying upon the stability of these means. The optical components of this invention are fewer and simpler than those of other known systems which may be used for the same purpose. The procedure of aligning the optical parts in assembly is very simple and may be checked easily by the user and corrected by him, if necessary, to insure that the measuring direction is normal to the chosen reference surface. The sensitivity is twice that of the prior art Michelson-type interferometer or Fabry-Perot type interferometer.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having fully described my invention, what I claim as new and desire to secure by Letters Patent is:

1. In an interferometer, an optically flat member, a partial reflector on a first portion of said optically flat member for receiving incident radiation, a substantially full reflector on a second substantially coplanar portion of said optically flat member, a retroreflector positioned to retroreflect that portion of said radiation which is transmitted by said partial reflector portion of said optically flat member to the full reflector portion thereof and to retroreflect the radiation reflected by said full reflector portion back to said partial reflector portion for recombination of a portion of said radiation with that portion of said radiation which has been originally reflected by said partial reflector.

2. In an interferometer, an optically flat member, a beam splitter on a first portion of said optically flat member, a substantially full reflector on a second portion of said optically flat member, and a retroreflector positioned to transmit radiation between said first and second portions of said optically flat member, whereby a portion of an incident beam will be reflected by the beam splitter and a portion will be transmitted by the beam splitter through the retroreflector to the full reflector for transmittal back to said beam splitter for combination in optical interference with the originally reflected portion of the beam.

3. An interferometer system comprising a beam splitter for splitting an incident beam into a first beam and a second beam, a retroreflector, a plane reflector, substantially flat supporting means holding said plane reflector and said beam splitter in fixed adjacent positions, and means for altering the path length of said first beam as measured between its splitting from said second beam at the beam splitter and its recombining interferometrically with the second beam at the beam splitter, said retroreflector retroreflecting said first beam to said plane reflector and thereafter back to said beam splitter, said second beam having substantially zero optical path length between its splitting from and its combining interferometrically with said first beam.

4. An interferometer system comprising a beam splitter for splitting an incident beam into a first beam and a second beam, a retroreflector, said retroreflector characterized by the fact that light rays reflected from said retroreflector are parallel to light rays incident thereon, a plane reflector, substantially flat supporting means holding said plane reflector and said beam splitter in fixed adjacent positions, said system including means for aligning the elements of said system by which said first beam is reflected in sequence by said retroreflector, by said plane reflector and again by said retroreflector to be recombined in optical interference with said second beam at said beam splitter.

5. An interferometer system comprising a source of electromagnetic radiation, means for controlling the frequency of the radiation, means for controlling the aperture and field angle of the radiation, semifacial reflector means including a beam splitter extending over a first portion of its aperture and a bifacial reflector extending over a second portion of its aperture, said beam splitter splitting the radiation into first and second beams, retroreflector means positioned to receive and retroreflect the first beam, said retroreflector means directing the first beam to said bifacial reflector means functioning as end reflector means which reflects said first beam back through said retroreflector means to said beam splitter, said beam splitter recombining said first and second beams to interfere in the optical sense, the second beam having substantially zero optical path length between its splitting from and its recombining with the first beam, dividing plate means for separating a portion of the interfering beams from the incident beam, and means for detecting the interference phenomena resulting from the configuration, dimensions, media and wavelengths involved in the interferometer system.

6. An interferometer system as claimed in claim 5 in which fringes are reversibly counted by means including means for splitting the aperture of the system into two parts whereby one part of one beam experiences a phase retardation of approximately an odd multiple of 90° with respect to the other part of the same beam, each of the two parts of the aperture producing its own effect on one of two radiation detector means responsive thereto, the outputs thereof providing direction sensing information as well as path difference change information.

7. An interferometer system comprising a source of electromagnetic radiation, means for controlling the frequency of the radiation, means for controlling the aperture and field angle of the radiation, semifacial reflector means for splitting the radiation into first and second beams, retroreflector means having a substantially spherical contact tip whose spherical center substantially coincides with the symmetry center of the retroreflector means positioned to receive and retroreflect the first beam, said retroreflector means directing the first beam to a bifacial reflector functioning as an end reflector which reflects said split beam back through said retroreflector means to said semifacial reflector means, said semifacial reflector means recombining said split beams to interfere in the optical sense, the second beam having substantially zero optical path length between its splitting from and its recombining with the first beam, dividing plate means for separating a portion of the interfering beams from the incident beam, and means for detecting the interference phenomena resulting from the configuration, dimensions, media and wavelengths involved in the interferometer system.

8. An interferometer system comprising a semifacial reflector presenting an aperture, a retroreflector, said retroreflector possessing the property of reflecting incident radiation such that the angle of deviation is substantially equal to 180 degrees for angles of incidence within its useful field, said semifacial reflector including a beam splitter over a first portion of its aperture and a full reflector over a second portion of its aperture, said beam splitter providing for splitting an incident beam into a first beam and a second beam, said full reflector providing an end reflector, said system including means by which said first beam is reflected in sequence by said retroreflector, by said full reflector and again by said retroreflector to be recombined interferometrically with said second beam.

References Cited in the file of this patent

UNITED STATES PATENTS

| | | |
|---|---|---|
| 2,571,937 | Peck | Oct. 16, 1951 |
| 2,583,596 | Root | Jan. 29, 1952 |
| 2,604,004 | Root | July 22, 1952 |
| 2,612,074 | Miran | Sept. 30, 1952 |
| 2,795,991 | Tuzi | June 18, 1957 |

FOREIGN PATENTS

| | | |
|---|---|---|
| 595,211 | Germany | Apr. 12, 1934 |
| 1,030,059 | Germany | May 14, 1958 |